May 4, 1954  J. B. McKAY ET AL  2,677,608
PROCESS FOR SUPPLYING MATERIALS TO REACTOR FURNACES
Filed March 21, 1950  2 Sheets-Sheet 1
FIG. I.
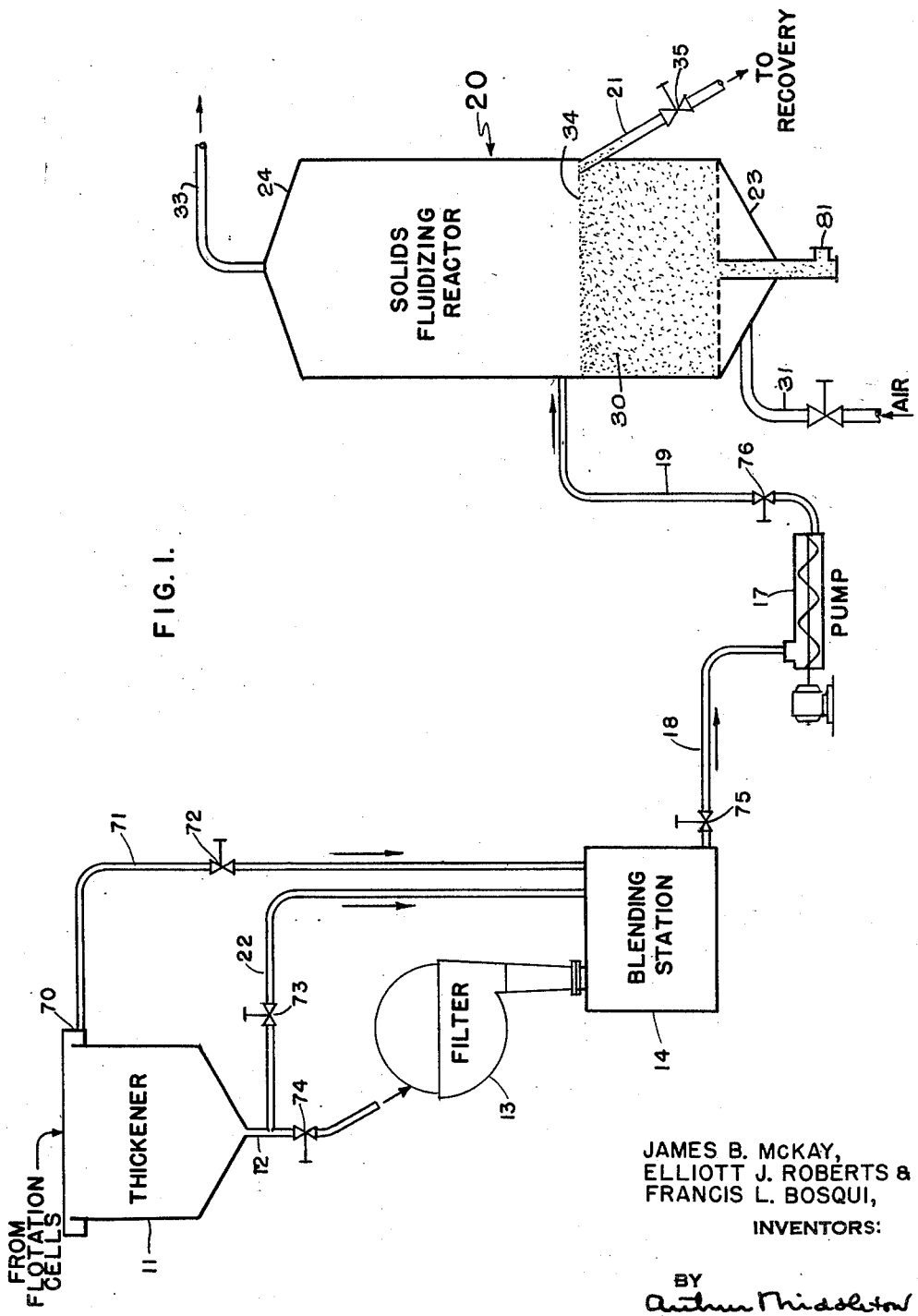
JAMES B. McKAY,
ELLIOTT J. ROBERTS &
FRANCIS L. BOSQUI,
INVENTORS:
BY
Arthur Middleton
ATTORNEY

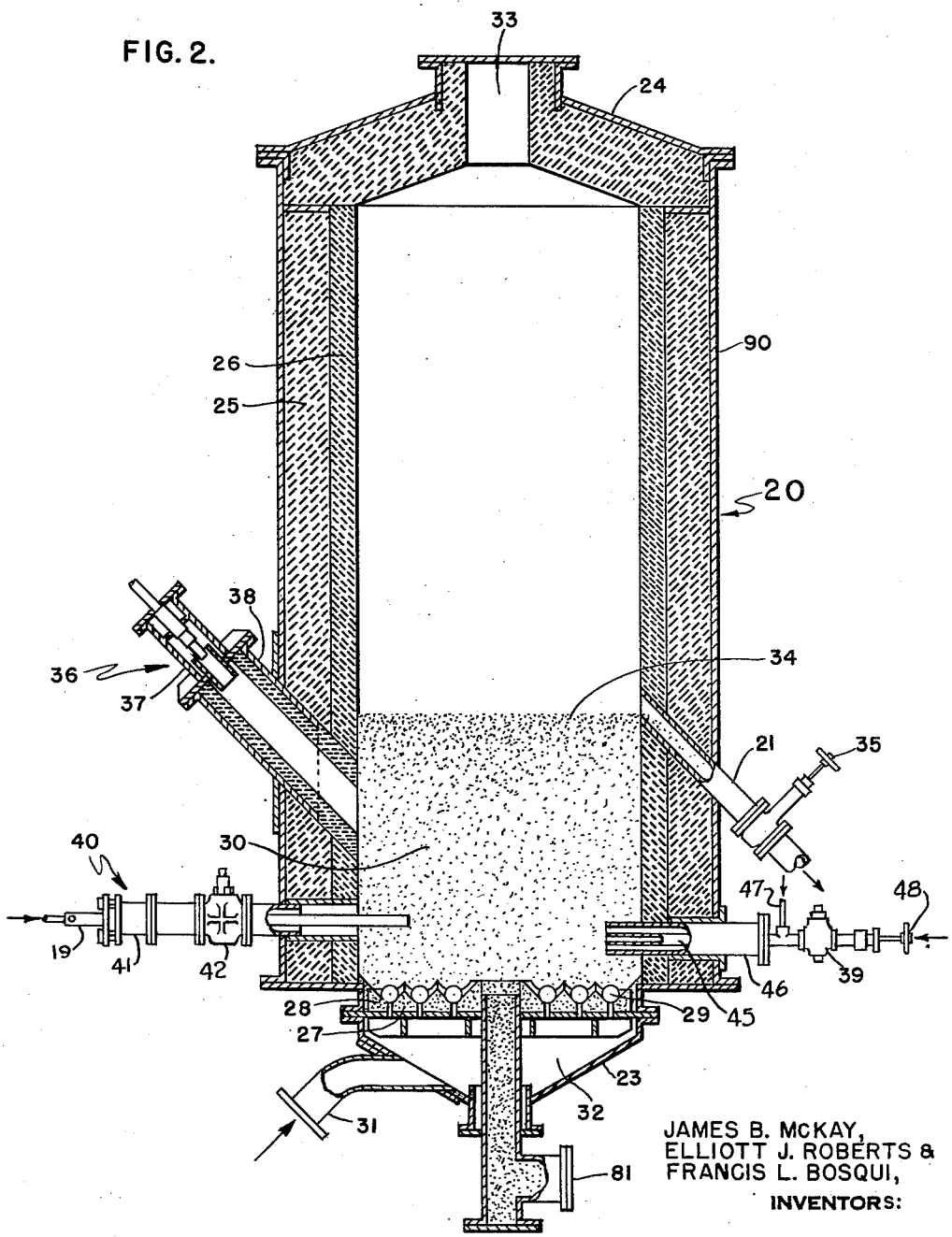

Patented May 4, 1954

2,677,608

UNITED STATES PATENT OFFICE 2,677,608

PROCESS FOR SUPPLYING MATERIALS TO REACTOR FURNACES

James B. McKay, Springdale, and Elliott J. Roberts and Francis L. Bosqui, Westport, Conn., assignors to The Dorr Company, Stamford, Conn., a corporation of Delaware Application March 21, 1950, Serial No. 150,844

3 Claims. (Cl. 75—9)

This invention relates to a method of carrying out reactions under solids-fluidization conditions; more specifically, it relates to a method of supplying a wet feed in the form of a slurry to a reactor or furnace in which is contained a bed of solids maintained in a fluidized condition.

In the past, when carrying out reactions for operations in which the material was in a fluidized condition, it was necessary to supply the feed solids to the reactor as a dry finely-divided substance. The reactor, which contains the solids under fluidized conditions, when originally introduced, was looked upon and treated like any ordinary furnace, and the method of feeding furnaces, based on long established custom, is by dry solids. Furthermore, it was felt that the addition of anything less than a dry solid to a fluidized bed would result in stickiness of the particles and defluidization of the bed, because of the large temperature differential between the incoming feed and the fluidized bed.

The prior method of supplying solids to this type of reactor, i. e., dry feeding, presents numerous difficulties on a commercial scale. First and foremost is the problem of devising a satisfactory screw feeder, star feeder, or other type of feeder which will operate without numerous mechanical difficulties causing frequent shutdowns. This has been the subject of many patents covering apparatus for feeding dry solids, including, as typical examples, Patents Nos. 2,392,764, 2,392,765 and 2,296,309.

In many solids-fluidization reactors, there is an additional problem encountered in attempting to regulate the temperature of materials which are self-roasting and whose temperature tends to run away and increase to undesired heights. In order to maintain some sort of a check on the temperature of these materials it has been necessary to utilize heat exchange equipment, such as shown in Patent No. 2,474,583.

It is then the principal object of this invention to discover a method of feeding solids to a solids-fluidization reactor so as to eliminate the numerous operations which are currently employed in preparing solids for feeding to such a reactor. It is an object of this invention to discover a method and apparatus which might be used for supplying a slurry feed to a solids-fluidization reactor, and at the same time effect a means for controlling the temperature of those type materials on which it is desirable to maintain a temperature control. As specific objects, it is desired to discover a method of supplying wet pyrite ores, wet vanadium bearing ores, or other wet ores to a reactor wherein they may be treated at a simultaneously controlled temperature while in the fluidized state. Other objects will become apparent from a reading of the description of this invention.

The objects are attainable by this invention which involves broadly the use of a feed material which has been diluted with a liquid so that although it has a high solids concentration it may be easily pumped. It has been found that, despite the prior teachings requiring a dry feed, if a slurry feed of a liquid-solids mixture is used following the procedures to be described later, a slurried feed material may be developed which has many advantages. We have found that an aqueous suspension may be used as a feed to a solids fluidization reactor and the bed of fluidized solids in the reactor can nevertheless be maintained in a fluidized condition. In order to remove the water which is being fed to the reactor along with the solids to be treated, several alternatives have been found to be operable. If the ore or other solid contains an oxidizable material—that is, if it is said to be self-roasting—then the heat exothermically generated from the self-roasting operation will drive off the water which is supplied with this solid. If the oxidizable constituents of the solid are not present in sufficient quantities to effect the above, or if the solids do not contain an oxidizable material, then fuel must be supplied to the reactor to yield sufficient heat to drive off this moisture. We have demonstrated that liquid fuel, such as oil, or other liquid combustible hydrocarbon compound, may be mixed with a water slurry and this mixture supplied through a single inlet conduit to the reactor. Thus in one and the same operation the reactor is supplied with a synergistic mixture containing solids to be treated, excess water, and fuel to drive off this excess water.

When the materials are of the self-roasting type, such as sulfides, and a temperature control is desired, it has been found that there is a synergistic effect between the water and the solids comprising the slurry which is fed to the reactor. The water serves as a diluent, creating a material which may be easily pumped. In addition, the water upon being vaporized exercises a temperature-lowering effect on an ore which when being roasted is tending to increase in temperature. This tendency of the vaporization of the water of the slurry feed to lower and the oxidizing materials of the slurry feed to raise the temperature results in a new type of feed, which is readily pumpable and contains its own temperature control. In other words, the feed is pumpable and it also controls the temperature within the fluidized bed.

When specifically applied to the exothermic roasting of metal sulfide ores, this invention utilizes a single fluidized bed for a plurality of purposes including (1) the evaporation of the slurry liquid to yield a dry reactant solid while also furnishing temperature control within the bed, and (2) the exothermic roasting of the dry solids to yield both a gaseous reaction product such as $SO_2$, and a solid reaction product such as a metal oxide.

Before discussing the specific features of this invention, it might be helpful to discuss the nature of the fluidized state, or fluidization.

Fluidization is a phenomenon wherein finely-divided solids are maintained suspended in an upflowing gas stream in such a way that they appear to have characteristics of a fluid. The fluidized solids reactor or roaster or furnace in its most simple form is a vertical vessel having an apertured constriction plate in its lower portion. Finely-divided solids are supplied to the reactor above the constriction plate and gas is passed upwardly from the bottom of the vessel through the apertures of the constriction plate and through the powdered solids. The solids are in a dense turbulent suspension which is referred to as a fluidized bed.

The density of solids concentration per unit volume of such bed is very high, usually of the order of 10 to 100 lbs. per cubic foot of bed volume. This bed density is to be contrasted with typical dilute dispersions or suspensions, such as dusty air, wherein the density of solids concentration is of the order of only $\frac{1}{50}$ of a pound per cubic foot of the dispersion. In addition the solid particles of the fluidized bed are in a high state of turbulence or erratic zig-zag motion in the bed even when the suspending gas velocity is quite low. This high turbulence causes intimate and rapid mixing of the solid particles so that in a typical bed complete mixing of the solids appears to take place instantaneously. The fluidized bed, because of its high density and great turbulence, is noted for the rapid transfer of heat between its solid and gaseous components. This heat transfer is so rapid that a remarkable uniformity or homogeneity in the temperature of the bed results.

The preferred embodiment of this invention now known to us has been chosen for the purpose of illustration but it is to be understood for that purpose only and it is not to be taken as limiting, because obviously changes and substitutions are possible as long as they fall within the metes and bounds defined by the appended claims including the equivalents of the claimed requirements. The invention has been illustrated in the accompanying drawings in which Fig. 1 shows a typical flowsheet which might be utilized for treating a wet material carried through from a filter or thickener to the solids-fluidizing reactor. Fig. 2 is a cross-sectional view of a typical solids-fluidization reactor showing the relationship of its various components.

In Fig. 1, the liquid coming from prior treatment such as flotation cells or leaching tanks, is sent to thickener 11 where its solids concentration is increased. The mud-like thickener underflow, containing the coherent wet mass of solids which we wish to further treat, leaves thickener 11 through pipe 12 and is sent either to filter 13 or to blending station 14. If sent to filter 13 it is controlled by valve 74 and yields a filter cake which is supplied to blending station 14. Also entering blending station 14 is thickener underflow which is not sent through the filter. This liquid comes through pipe 12, thence into pipe 22 and finally into blending station 14. Its flow is controlled by valve 73. The relative amounts of thickener underflow and filter cake may be varied in order to produce a slurry of the proper characteristics in the blending station. It may be stated that a slurry, unlike a sludge, must be agitated constantly to keep its solids from stratifying. If the slurry is too thick, diluent from the top portion 70 of the thickener may be fed by pipe 71 into the blending station. Valve 72 controls the rate of flow, if any, through pipe 71. A slurry is removed from blending station 14 through pipe 18 by a positive displacement pump 17 of the Moyno type. Valve 75 controls the pump feed. The pump injects the slurry through pipe 19 controlled by valve 76 into reactor 20. After being roasted in reactor 20 the roasted product is recovered for further treatment through conduit 21. Valve 35 controls the rate at which the solids are removed from reactor 20.

In Fig. 2 of the drawings is shown a typical reactor for carrying out the operations which have been previously described. Fig. 2 shows reactor 20, comprising outer shell 90, top unit 24 and bottom unit 23. The outer shell 90 is lined with insulating refractory bricks 25 and fire clay brick 26. It contains a horizontal apertured constriction plate 27 which is lined with refractory material 28. The refractory material is so designed that it will form cones over each aperture and into each of these cones is placed a ball check 29. This ball check prevents the fine solids of bed 30 from falling back through the apertures when the reactor is shut down. Air or other gas for fluidizing bed 30 is introduced through valve air inlet 31. This gas passes into windbox 32 and then upwardly through apertures 28 in constriction plate 27 into the bed. After the gas passes upwardly through the bed, it is removed from the reactor through gas outlet 33 to further recovery or exhaust.

As solids are supplied to the bed the height of the bed increases until it reaches its upper level 34 determined by spillpipe 21. The solids then, behaving like a liquid, flow down spillpipe 21 to further treatment or recovery. The rate at which solids are removed from spillpipe 21 is controlled by valve 35. An auxiliary burner assembly 36 is used to heat up the bed when the reactor is first started. This auxiliary burner assembly comprises burner 37 and insulated casing 38. After the unit is up to operating temperature this burner is shut down. If further heat is necessary it is supplied by direct injection of fuel into the bed through fuel gun 39. The solids are supplied to the reactor in the form of a slurry through feed injector assembly 40.

It has been found that the use of a slurry feed has been particularly useful in the treatment of flotation concentrates of ores containing sulfides together with other materials, and also in the treatment of slurries of precipitated material coming from leaching operations, wherein each of the above materials is intended to be fed to a solids-fluidization reactor.

The slurry may be fed to the reactor by feeding it into the freeboard space above the bed as is shown in Figure 1; or the slurry may be fed directly into the fluidized bed beneath the surface thereof as is shown by Figure 2.

*Example 1*

The process described in this invention has been used in the treatment of flotation concentrates containing sulfides, particularly of the arseno-pyrite type, wherein it is necessary to subject these pyrites to a roasting operation before recovering their gold content by cyanidation.

In the prior art method of treating these concentrates, they are sent to a thickening station, with the thickener underflow being sent to a filter press. The filter cake is dried in a rotary drier, pulverized and supplied by screw feeder to a solids-fluidizing reactor. It is necessary, following these old processes, that heat be supplied to the drier, thus creating a fixed cost for this item. The dried material must be ground or otherwise pulverized to create the fine enough particle size required for fluidization and screw feeding. It is imperative that there be no moisture present in the solids so that stickiness in the screw feeder will be prevented. When the material has been fed to the reactor and is in the process of being roasted, it is ordinarily necessary to provide heat exchangers to keep the temperature under control. If excessive temperatures are reached, using the customary processes, the material will fuse, agglomerate into larger particles and defluidize. Despite the need to keep the temperature from becoming excessive, nevertheless the ore must be completely roasted so that all of the oxidizable constituents are reacted, in order to secure high gold recovery with economical cyanide consumption.

Following the process of this invention, a method for treating these gold-bearing pyrite ores has been developed in which virtually all of the above recited steps are eliminated and only one control, i. e., the amount of water present in the feed slurry, is needed.

In treating these ores, a flotation concentrate having the following assay was used, as a typical example:

30.27% Fe
17.83% S
5.45% As
1.415 oz. Au/T

This flotation concentrate was supplied to a standard thickener and following a flowsheet as shown in Figure 1, the thickener underflow was in turn supplied to a blending station.

This blending station used was a 5½ x 6 ft. round tank with an agitator powered by a 7½ hp. motor geared to 48 R. P. M. The shaft extends to within 6 inches of the bottom of the tank and at the bottom of the tank is a single full-width paddle connected to the bottom of the shaft. The paddle has a 2 inch face and a ¾ x 3 inch stiffener. The unit requires 3 to 4 amps, with a feed density varying from 76 to 82% solids. If the solids density increases much over this concentration using this type apparatus, the pulp becomes so thick that the top layer hardly revolves.

For removing the slurry from this tank a standard Moyno pump was used with a rate capacity of 52 to 58 tons per day, the rate depending on the percent of solids in the feed. In actual practice, a rate of 50 tons per day at 80% solids was used.

If the temperature of the solids being roasted in the bed of the furnace tends to increase to a point near the uppermost limit of the desired range, which is 1350° F.–1600° F. with 1350° F. being preferred, then the concentration of the slurry may be cut down slightly by feeding in diluent solution from the top of the thickener to the blending station. If the temperature is observed to be decreasing, then a portion of the thickener underflow may be diverted to the filter. The concentrate or cake from the filter is then sent to the blending station where it is used to increase the percentage of solids in the slurry. By this method a simple control over the process is attained and many expensive operations are eliminated.

*Example 2*

Another application of the process of this invention is in the treatment of vanadium ores. By the present day processes, vanadium pentoxide is made by calcining the hydrate, usually in rotary driers. However, this method of treatment was not very desirable because the ore had a residence in the drier of approximately 20 minutes during which time it became contaminated with a portion of the refractory material lining the drier. This type of product was not desirable for use as a chemically pure product, for use as metallurgical chrome or for pigments. The approximate cost of this type of treatment from the filtration step through calcining step is about $3.60 to $6.25 per ton, the cost varying due to the water content, the character of the mineral and the grain size.

By the use of this invention, it is possible to make an absolutely pure product which is useful for any of the above mentioned requirements and the approximate cost is $2.00 to $3.00 per ton, with many of the operations of the prior methods being eliminated. In addition to the purity, much finer control over the operating temperatures is realized.

In our process, a vanadium hydrate slurry coming from a leaching operation is supplied to a thickener, again following the flowsheet outlined in Fig. 1. From the thickener, the slurry which is the thickener underflow either goes to a filter or directly to a blending station, the relative amounts of each being determined by the condition of the slurry in the blending station, it being desirable to maintain as concentrated a slurry as the pump is capable of moving.

From the blending station, the slurry is pumped, through a nozzle, into a reactor as shown in Fig. 2. Here because of the large heat reservoir which is present in the form of the fluidized bed, the moisture is quickly removed and the hydrate is calcined to vanadium pentoxide. This operation is endothermic as distinguished from Example 1 which was exothermic. In order to supply the heat necessary for the endothermic reaction, fuel oil is supplied by mixing with the slurry in the blending station just before going to the pump. Thus there is obtained a mixture in which the heat producing medium (oil) and the heat absorbing medium (water) are intimately intermixed. In lieu of mixing the oil in the blending station, or in addition to the oil which may be supplied in this manner, oil may also be added directly to the reactor and caused to burn in the bed, thereby maintaining the necessary calcining temperature. This method, however, requires that there be two nozzles present in the reactor, rather than the one nozzle required if the oil is premixed with slurry. However, separate independent feeding does not have all the advantages of the mixed feeding.

We claim:

1. The continuous process of feeding an already wet coherent thickened and filtered mud of ground metal sulfide ore solids into a solids-fluidizing reactor wherein the ore is combustibly roasted to yield a reaction-product metal-bearing calcine of such sulfide, which comprises maintaining in an enclosed chamber having a superjacent gas-collecting space and a subjacent bed of roastable sulfide ore solids in fluidized condition supported from a gas-pervious partition by supplying an oxygen-bearing gas dispersingly through the partition at solids-fluidizing velocity, effecting combustion in the bed between its fluidizing gas and its roastable solids to heat the bed to a temperature lying in the roasting range whereby to yield a calcine that is chemically different from the feed solids, controlling the fluid-level of the bed, discharging roasted ore solids from the fluid-level, replacing solids so discharged by feeding to the reactor above the partition filter-cake of such ore that is in finely-divided thickened and filtered condition by mechanically pumping a slurry blended of such cake and flowability-increasing vaporizable liquid, and controlling the quantity of flowability-increasing liquid to leave the slurry with as high a solids consistency as can be so pumped.

2. The process according to claim 1, wherein the vaporizable liquid used is a liquid suspension of such ore.

3. The process according to claim 1, wherein the quantity of vaporizable liquid added to the filter-cake in the slurrying thereof is such to be sufficient to control the temperature of the bed whereby it does not exceed 1600° F.

References Cited in the file of this patent

UNITED STATES PATENTS

| Number | Name | Date |
|---|---|---|
| 2,209,331 | Haglund | July 30, 1940 |
| 2,482,187 | Johnson | Sept. 20, 1949 |
| 2,497,790 | Pauvrasseau | Feb. 14, 1950 |
| 2,567,959 | Munday | Sept. 18, 1951 |

OTHER REFERENCES

The Canadian Mining and Metallurgical Bulletin for April, 1949, Montreal. Pages 178–187, inclusive. Article by Matthews.